March 19, 1968 N. GOLDSMITH 3,374,125

METHOD OF FORMING A PN JUNCTION BY VAPORIZATION

Filed May 10, 1965 2 Sheets-Sheet 1

INVENTOR.
NORMAN GOLDSMITH
BY
Glenn H. Bruestle
ATTORNEY

METHOD OF FORMING A PN JUNCTION BY VAPORIZATION

Filed May 10, 1965

2 Sheets-Sheet 2

INVENTOR.
NORMAN GOLDSMITH
BY
Glenn H. Bruestle
ATTORNEY

United States Patent Office 3,374,125
Patented Mar. 19, 1968

3,374,125

METHOD OF FORMING A PN JUNCTION BY VAPORIZATION

Norman Goldsmith, Piscataway, N.J., assignor to Radio Corporation of America, a corporation of Delaware Filed May 10, 1965, Ser. No. 454,474
14 Claims. (Cl. 148—189)

ABSTRACT OF THE DISCLOSURE

A diffusion method for producing a region of altered electrical characteristics in a semiconductive body comprises the steps of:

Figures 1, 1A, 1B:
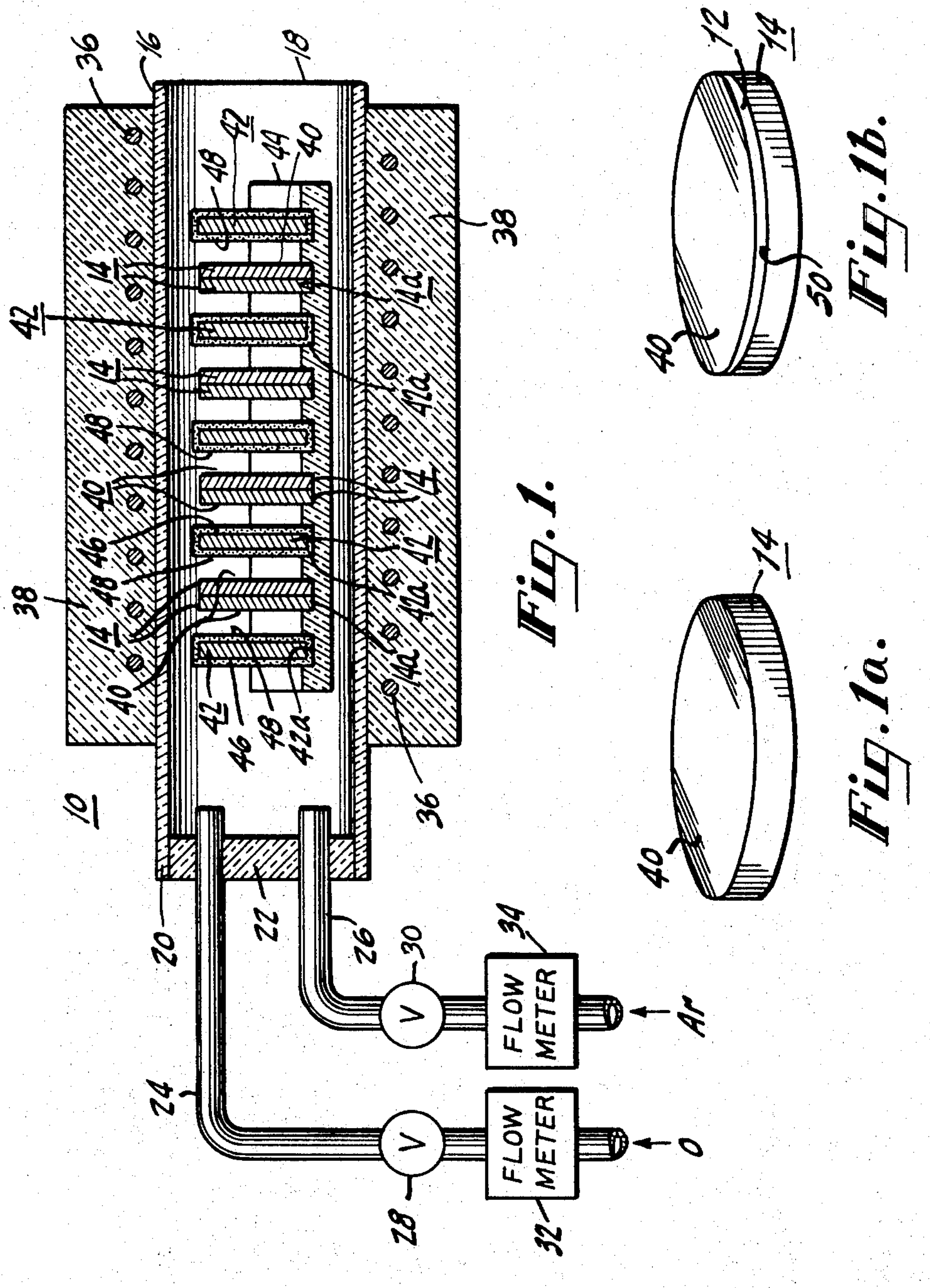

(a) Oxidizing a body of a nitride of a metal chosen from the group consisting of boron, gallium, indium, and aluminum to form a metal oxide, (b) Disposing the bodies with adjacent surfaces substantially parallel to, but spaced no more than 250 mils from, each other, (c) Heating the bodies to vaporize the metal oxide, and (d) Maintaining the bodies at the temperature of vaporization for at least 20 minutes to allow the metal of the metal oxide to diffuse through the semiconductive body to produce the region of altered electrical characteristics.

This invention relates generally to diffusion methods, and more particularly to an improved method of diffusing certain impurities into semiconductive materials. The improved method of the present invention is particularly useful for producing a region of altered electrical characteristics in, e.g., silicon or germanium wafers to provide a PN junction therein.

It has been proposed to dope a first semiconductive body by heating it in an evacuated system with a relatively large second body of semiconductive material that contains an impurity therein. While such a method may be satisfactory for certain applications, it is relatively difficult to carry out and to control the doping of the first semiconductive body in a closed evacuated system. It has also been proposed to dope semiconductive bodies by melting boron oxide in a platinum boat and directing vaporized boron oxide over wafers of the semiconductive bodies to be doped. The latter method requires relatively expensive equipment and does not always dope the semiconductive bodies uniformly because the spatial distribution of the vaporized boron oxide is not uniform across the surface of the semiconductive bodies. Also, the source of boron oxide is depleted rapidly, requiring frequent reloading of the platinum boats.

Still another proposed method of doping semiconductive bodies has been one wherein boron bromide and oxygen are introduced separately into a furnace containing the semiconductive bodies. In such a method, a chemical reaction between the boron bromide and the oxygen takes place within the furnace, producing boron oxide and bromine. The flow rate of both the oxygen and the boron bromide is critical, and a by-product of the reaction, bromine, is corrosive. The semiconductive bodies are not generally doped uniformly by this method, in the absence of means to provide turbulence of the reacting gases because the concentration of vaporized dopant in the reacting gases diminishes with the distance from the region of the chemical reaction. Also, boron oxide tends to form on the walls of the furnace, where it is not wanted, in this method.

It is an object of the present invention to provide an improved method of diffusing an impurity uniformly into semiconductive bodies.

Another object of the present invention is to provide an improved diffusion method for doping a semiconductive body wherein the source of the dopant is relatively inexpensive, safe to handle, and virtually inexhaustible.

Still another object of the present invention is to provide an improved method for diffusing an impurity into a semiconductive body without producing undesirable byproducts, without requiring critical flow rates of reactants, and without the necessity for providing turbulence of the dopant to obtain uniformity.

A further object of the present invention is to provide an improved method for producing a region of altered electrical characteristics in a semiconductive body that does not require the use of expensive equipment or a closed evacuated system, and that may make use of conventional equipment wherein the semiconductive bodies and the dopants are easily accessible.

Still a further object of the present invention is to provide an improved diffusion method of the type described that is relatively simple and inexpensive to carry out and that produces simultaneously a plurality of doped semiconductive bodies of good uniformity.

The improved diffusion method is particularly applicable for doping silicon and germanium with P type impurities. Briefly stated, a preferred embodiment of the method comprises: (1) disposing, in a non-oxidizing atmosphere, a wafer which includes as a surface layer thereof an oxide of a metal chosen from the group consisting of boron, gallium, indium, and alumium, adjacent and substantially parallel to, but slightly spaced from, a surface of the semiconductive body to be doped, and (2) heating the wafer and the body to a temperature at which the metal oxide vaporizes and the metal of the oxide diffuses into the semiconductive body. The doping wafer may comprise a wafer of a surface oxidized metal nitride. The doping wafer may be either a body of compacted powder or solid metal oxide, a surface oxidized compacted metal nitride, or a doped semiconductor material.

Figure 3:
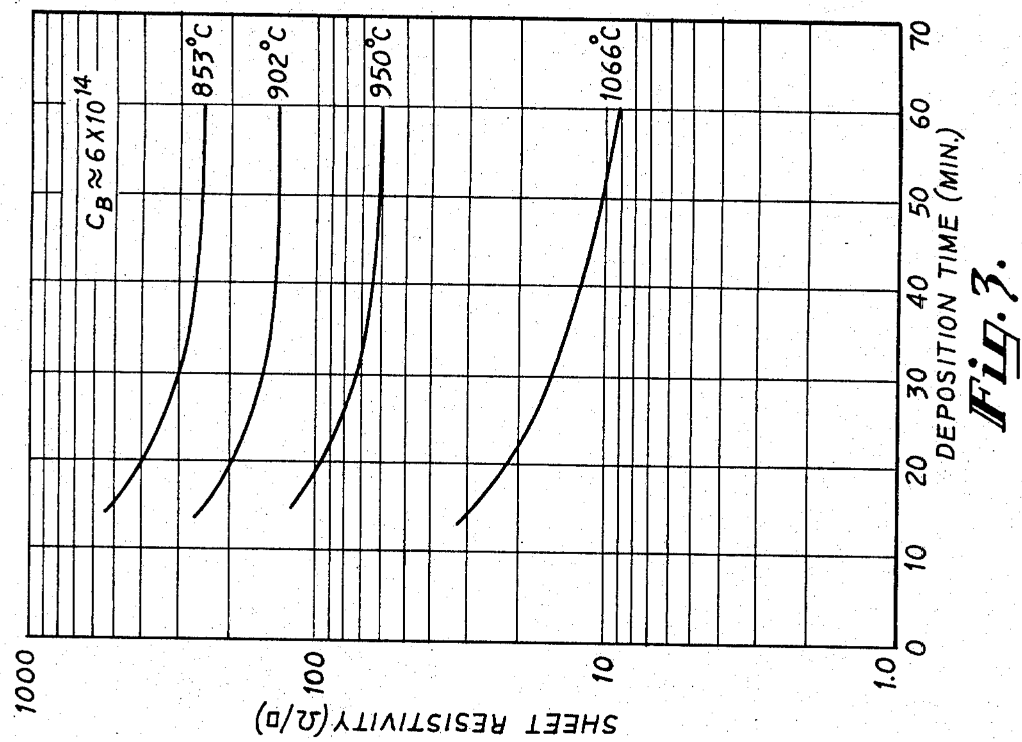
Figure 2:
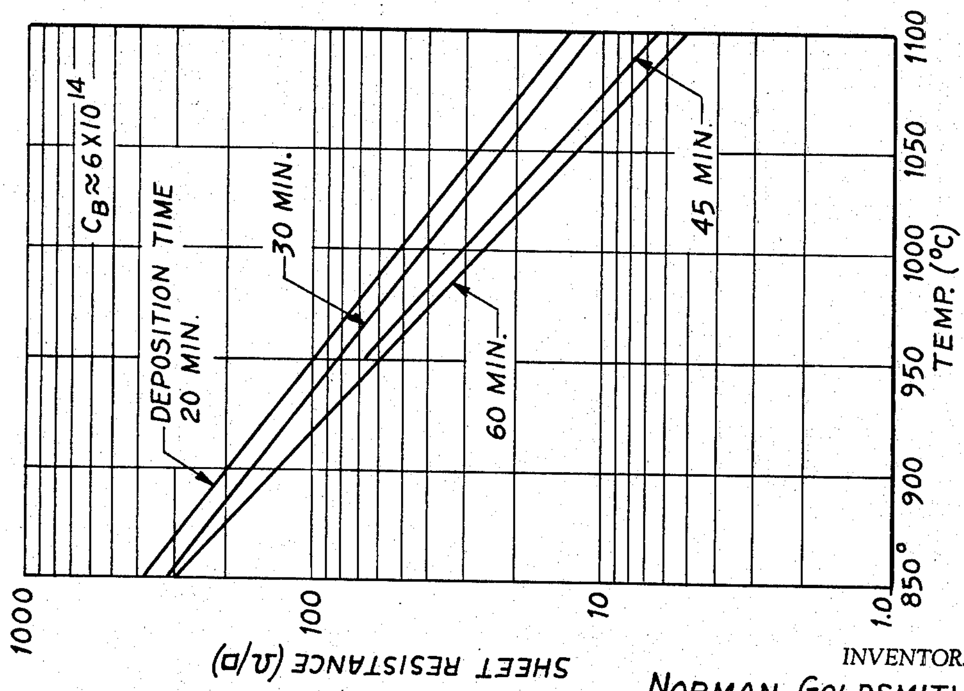

The novel features of the present invention, both as to its organization and operation, as well as additional objects and advantages thereof, will be more readily understood from the following description, when read in connection with the accompanying drawings, in which similar reference characters represent similar parts throughout, and in which:

FIG. 1 is a cross-sectional view of bodies of semiconductive material disposed between doping wafers in a furnace for carrying out the improved diffusion method of the present invention;

FIG. 1*a* is an enlarged perspective view of a body of semiconductive material of the type to be doped by the method of the present invention;

FIG. 1*b* is an enlarged perspective view of the FIG. 1*a* body of semiconductive material illustrating a region of altered electrical characteristics diffused into the wafer in accordance with the present method;

FIG. 2 is a graph illustrating the resistivity versus temperature characteristics for different doping periods of bodies of silicon, employing oxidized boron nitride as the dopant; and FIG. 3 is a graph of the resistivity versus time characteristics for silicon bodies doped at different temperatures in accordance with the present invention.

Referring now particularly to FIGS. 1, 1*a*, and 1*b* of the drawings, there is shown a furnace 10 used in the method of producing a region 12 of altered electrical characteristics in a semiconductive body 14 of monocrystalline silicon or germanium, for example. The body 14 is preferably in the form of a wafer. The furnace 10 comprises a tube 16 of quartz that is open at one end 18 thereof to the atmosphere. The other end 20 of the tube 16 is sealed with a heat insulating plug 22. Two quartz tubes 24 and 26 extend through the plug 22 to direct oxygen and a non-oxidizing gas, respectively, through the tube 16, as will hereinafter be explained. Valves 28 and 30 and flow meters 32 and 34 are connected in series with the tubes 24 and 26, respectively, for controlling and metering the gases to be directed into the tube 16. The tube 16 is surrounded by a heating coil 36 and heat insulating material 38 for heating the tube 16 and its contents to desired temperatures, in a manner well known in the art.

The source of the impurity or dopant to be diffused into the semiconductive body 14 is a metal oxide of a Group III metal, such as boron, gallium, indium, or aluminum. Since some of these metal oxides, such as boron oxide, for example, are liquid at appropriate diffusion temperatures, and since it is desirable for uniform doping that all points on a major surface 40 of the semiconductive body 14 be equidistant from the dopant source, means are provided to arrange a surface of the metal oxide substantially parallel to the major surface 40 of the semiconductive body 14. In one arrangement, a nitride of a Group III metal, such as boron nitride, is formed in the shape of a wafer 42 substantially similar in size to, but preferably slightly large than, the semiconductive body 14. Thus, a plurality of wafers 42 of boron nitride are disposed vertically in alternate slots 42*a* of a V-shaped quartz boat 44, and the latter is disposed within the tube 16 of the furnace 10 through the open end 18 thereof.

The surfaces of the wafers 42 of boron nitride are oxidized by heating them at a temperature of about 955° C. for about one hour in a stream of oxygen provided through the tube 24, the valve 28, and the flow meter 32. At the end of this time, each wafer 42 of boron nitride is covered with a thin coating 46 of boron oxide, the reaction within the furnace 10 being:

$$2BN+3/2O_2 \rightarrow B_2O_3+N_2$$

The valve 28 is now closed, no further oxidation of the wafer 42 being necessary. The wafers 42 are oxidized in the absence of the semiconductive bodies 14.

To diffuse a P type region 12 in the semiconductive body 14, a pair of semiconductive bodies 14 are first disposed, back to back, in each of alternate slots 14*a*, between the alternate slots 42*a*, in the boat 44. Thus, the major surface 40 of each body 14 is disposed adjacent and parallel to, but spaced from, a major surface 48 of a surface-oxidized nitride wafer 42. The major surfaces 40 of the semiconductive bodies 14 should not touch the adjacent major surfaces 48 of the surface-oxidized wafers 42 because such touching would cause pock marks on, and undesirable doping of, the semiconductive bodies 14. On the other hand, the major surface 40 of each of the semiconductive bodies 14 should not be more than 250 mils from the adjacent major surface 48 of the respective oxidized wafer 42 to insure uniformity of doping of the semiconductive bodies 14 by the vapors of boror oxide, as will hereinafter be explained.

When the diameter of the furnace tube 16 is about 2 inches, for example, each semiconductive body 14 may have a diameter of about 1 to 1½ inches and the oxidized boron nitride wafer 42 may have a diameter of about 1 to 1¾ inches. The thickness of the semiconductive body 14 may vary from 4 to 20 mils, and the thickness of the surface-oxidized boron nitride wafer 42 may vary from 20 to 100 mils. Typical thicknesses of the semiconductive body 14 and the oxidized boron nitride wafer 42 are 10 mils and 60 mils, respectively. With a body 14 and a wafer 42 of the type described, a typical distance between the major surface 40 of the semiconductive body 14 and the major surface 48 of the oxidized wafer 42 is about 40 mils.

The diffusion of boron through the major surface 40 of the semiconductive bodies 14 is carried out by heating the alternately disposed, parallel bodies 14 and the oxidized wafers 42 in the furnace 10 to a temperature between 700° C. and 1200° C. in a non-oxidizing ambient. To obtain the non-oxidizing ambient, an inert gas, such as argon, nitrogen, helium, or forming gas (10% H and 90% N), for example, is directed through the tube 16 at a rate of about 3 strandard cubic feet per hour. The rate of flow of the inert gas through the tube 16 is controlled by the valve 30 and the flow meter 34. Although the coating 46 of boron oxide is liquid at these diffusion temperatures, the coating 46 is relatively thin, and merely wets the surface of the boron nitride wafer 42, and does not run off. Thus, the doping of each major surface 40 of the semiconductive bodies 14 is substantially uniform, each major surface 40 being substantially parallel to and equally spaced from an adjacent oxidized major surface 48 of the boron oxide source, the source of dopant. The boron oxide of the coating 46 is vaporized sufficiently between the temperatures of 700° C. and 1200° C. to cause boron to penetrate the major surface 40 of each semiconductive body 14 and to provide the P type region 12, as shown in FIG. 1*b*. The depth of the P type region 12 is a function of the temperature and the time of heating, at least 20 minutes being desirable to provide good control of the doping of the semiconductive body 14.

Referring now to FIG. 2 of the drawings, there is shown a graph of the variation in resistivity of the region 12 with temperature for different time periods. For example, heating alternately arranged and parallely disposed silicon bodies 14 and oxidized boron nitride wafers 42 at 900° C. for 20 minutes in argon produces a region 12 with a resistivity of 200 ohm per square, with no measurable variation over the surface 40 of the body 14 or between bodies 14. In this method, the only variation in the resistivities of the bodies 14 is primarily a function of temperature. Where the temperature within the furnace 10 is held substantially constant, the sheet resistivity is a function of the time of deposition, as shown in FIG. 3. The bodies 14 used for making the graphs in FIGS. 2 and 3 were N type silicon with a background doping level of $6\times10^{14}$ carriers.

The impurity (boron) introduced through the major surface 40 of the semiconductive body 14 to provide the doped region 12 can now be driven to any depth into the body 14, in any manner known in the art. For example, this can be done by removing the surface-oxidized wafers 42 from the furnace 10 and heating the semiconductive bodies 14 in the furnace 10 between 700° C. and 1200° C. until the impurities move to a desired depth. If the body 14 is originally of N type semiconductive material, the junction 50 between the diffused P type region 12 and the N type semiconductive material is a PN junction, possessing electrical rectifying properties.

Instead of using surface-oxidized boron nitride wafers 42 as a doping source for the semiconductive bodies 14, surface-oxidized wafers of gallium nitride, indium nitride, and aluminum nitride may also be used. Where the aforementioned nitrides are available only in powder form, the powders may be compacted to form the wafers 42 by the application of heat and high pressure, in a manner known in the art. The wafer 42 so obtained need not be of theoretical density for use in this invention. Gallium nitride and indium nitride wafers 42 may be oxidized to form a coating 48 of gallium and indium oxides, respectively, by heating the wafers in the furnace 10 in a stream of oxygen at about 700° C. for 15 minutes. An aluminum nitride wafer 42 may be oxidized to form a coating 48 of aluminum oxide by heating the nitride wafer at 955° C. for about one hour.

Surface-oxidized gallium and indium nitride wafers 42 may be used to diffuse impurities of gallium and indium, respectively, into the semiconductive bodies 14 by heating these alternately disposed and parallelly arranged wafers 42 and bodies 14 in the boat 44, in the furnace 10 at a temperature between 600° C. and 1100° C. for at least 20 minutes. The semiconductive bodies 14 may be doped with aluminum by heating the alternately disposed and parallelly arranged oxidized aluminum nitride wafers 42 and the semiconductive bodies 14 in the boat 44, in the furnace 10 at a temperature of between 1100° C. and 1300° C. for at least 20 minutes.

Where the metal oxide coating 46 is not liquid at the diffusion temperatures, as, for example, in the case of a coating 46 of aluminum oxide, and where the metal oxide is obtainable in a solid form capable of being formed into a wafer, the doping source may comprise a wafer 42 of the pure metal oxide. Aluminum oxide is usually available in solid form, and a suitably formed wafer of aluminum oxide may be substituted for the oxidized nitride wafer 42 for carrying out the aforementioned diffusion.

Instead of oxidizing the surfaces of the nitride wafers 42 in a stream of oxygen in the furnace 10, as previously described, the nitride wafers 42 may be oxidized elsewhere and arranged alternately between, and parallel to, the semiconductive bodies 14, as shown in FIG. 1, for the diffusion operation. For example, the surface of a wafer of boron nitride 42 may be oxidized by boiling it in a dilute basic solution for one half hour. The dilute basic solution may be sodium hydroxide. The surface of a boron wafer 42 may also be oxidized by washing it in hot water or by heating it in steam until the coating 46 of boron oxide is visible.

Once the coating 46 of boron oxide is formed on the nitride wafer 42, further active steps to oxidize the surface of the wafer 42 are unnecessary because the traces of oxygen present in the inert gas used during the diffusion operation are sufficient to replace the oxide on the coating 46 that is vaporized during the diffusion operation. Also, a sufficient amount of oxidation of the wafer 42 takes place when the boat 44 is removed from the furnace 10 for removing the doped semiconductive bodies 14. Thus, the nitride wafer 42 may be considered to be a self-replenishing source of the dopant. Wafers 42 are virtually inexhaustible under the aforementioned conditions, and relatively much less dopant is used in the instant diffusion method than in the aforementioned prior art methods.

Where the semiconductive bodies 14 are of germanium, the temperature of the furnace 10 should be maintained below the melting point (936° C.) of germanium during the diffusion operation.

From the foregoing description, it will be apparent that there has been provided an improved method of diffusing an impurity into a region of a semiconductive body which extends inwardly from the surface of the body. Because the dopant is preferably an oxide on the surface of a wafer that is relatively very close and parallel to the surface of the semiconductive body through which the metal of the vaporized oxide is diffused, the semiconductive bodies are doped uniformly. It is also apparent that, in the instant method, a plurality of substantially similar bodies can be doped simultaneously and uniformly, utilizing simple conventional equipment and employing easily available, relatively inexpensive, and safe dopants. The instant method may also be used for doping selective areas of a semiconductive substrate whose surface has been suitably masked, as in the manufacture of integrated circuits by photolithographic techniques. Also, while some variations in the steps of the present invention have been described, other variations in these operations, all coming within the spirit of this invention, will, no doubt readily suggest themselves to those skilled in the art. Hence, it is desired that the foregoing description shall be considered as illustrative and not in a limiting sense.

What is claimed is:

1. A diffusion method for producing a region of altered electrical characteristics in a semiconductive body of a material chosen from the group consisting of germanium and silicon which extends inwardly from a first surface of said body, said method comprising the steps of:

oxidizing a body of a nitride of a metal chosen from the group consisting of boron, gallium, indium, and aluminum to form a metal oxide on a second surface of the metal nitride, disposing said bodies with said first surface adjacent and substantially parallel to, but spaced from, said second surface in a non-oxidizing ambient, heating said bodies to a temperature between 600° C. and 1300° C. to vaporize said metal oxide, said temperature being below the melting point of said semiconductive body, and maintaining said bodies at said temperature for at least 20 minutes to allow the metal of said metal oxide to diffuse through said first surface to produce said region.

2. A diffusion method for producing a region of altered electrical characteristics in a semiconductive body which extends inwardly from a first surface of said body, said method comprising the steps of:

oxidizing a body of boron nitride to form a coating of boron oxide on a second surface thereof, disposing said bodies with said first surface adjacent and substantially parallel to, but spaced from, said second surface in a non-oxidizing ambient, heating said bodies to a temperature between 700° C. and 1200° C. to vaporize said boron oxide, said temperature being below the melting point of said semiconductive body, and maintaining said bodies at said temperature for at least 20 minutes, whereby boron from said vaporized boron oxide diffuses through said first surface to produce said region.

3. A diffusion method for producing a region of altered electrical characteristics in a semiconductive body which extends inwardly from a first surface of said body, said method comprising the steps of:

oxidizing a body of gallium nitride to form a coating of gallium oxide on a second surface thereof, disposing said bodies with said first surface adjacent and substantially parallel to, but spaced from, said second surface in a non-oxidizing ambient, heating said bodies to a temperature between 600° C. and 1100° C. to vaporize said gallium oxide, said temperature being below the melting point of said semiconductive body, and maintaining said bodies at said temperature for at least 20 minutes, whereby gallium from said gallium oxide diffuses through said first surface to produce said region.

4. A diffusion method for producing a region of altered electrical characteristics in a semiconductive body which extends inwardly from a first surface of said body, said method comprising the steps of:

oxidizing a body of indium nitride to form a coating of indium oxide on a second surface thereof, disposing said bodies with said first surface adjacent and substantially parallel to, but spaced from, said second surface in a non-oxidizing ambient, heating said bodies to a temperature between 600° C. and 1100° C. to vaporize said indium oxide, said temperature being below the melting point of said semiconductive body, and maintaining said bodies at said temperature for at least 20 minutes, whereby indium from indium oxide diffuses through said first surface to produce said region.

5. A diffusion for producing a region of altered electrical characteristics in a semiconductive body which extends inwardly from a first surface of said body, said method comprising the steps of:

oxidizing a body of aluminum nitride to form a coating of aluminum oxide on a second surface thereof, disposing said bodies with said first surface adjacent and substantially parallel to, but spaced from, said second surface in a non-oxidizing ambient, heating said bodies to a temperature between 1100° C. and 1300° C. to vaporize said aluminum oxide, said temperature being below the melting point of said semiconductive body, and maintaining said bodies at said temperature for at least 20 minutes, whereby aluminum from aluminum oxide diffuses through said first surface to produce said region.

6. A method of doping a wafer of semiconductive material with a P type impurity comprising the steps of:

oxidizing a body of a nitride of a metal chosen from the group consisting of boron, gallium, indium, and aluminum to form a coating of the metal oxide on a plane surface of said body, disposing, in a furnace open at one end to the atmosphere, a major surface of said wafer of semiconductive material substantially parallel to, and spaced no further than 250 mils from, said metal oxide coating on said plane surface of said oxidized metal nitride, passing a stream of a non-oxidizing gas over said body and said wafer and out to said atmosphere through said one end, to produce a non-oxidizing ambient in said furnace, and heating said body and said wafer, in said non-oxidizing ambient, to a temperature between 600° C. and 1300° C., said temperature being below the melting point of said semiconductive material but at least sufficient to vaporize said metal oxide for a time sufficient for the metal of said metal oxide to penetrate said major surface of said wafer of semiconductive material, whereby to dope said wafer of semiconductive material with said metal to a desired depth.

7. A method of doping a wafer of semiconductive material with boron comprising the steps of:

oxidizing a body of boron nitride to form a coating of boron oxide on a plane surface of said body, disposing, in a furnace open at one end to the atmosphere, a major surface of said wafer of semiconductive material substantially parallel to, and spaced no further than 250 mils from, said boron oxide coating on said plane surface of said oxidized boron nitride, passing a stream of a non-oxidizing gas over said body and said wafer and out to said atmosphere through said one end, to produce a non-oxidizing ambient in said furnace, and heating said body and said wafer, in said non-oxidizing ambient, to a temperature between 700° C. and 1200° C. to vaporize said boron oxide for at least 20 minutes, said temperature being below the melting point of said semiconductive material, so that the boron of said boron oxide can penetrate said major surface of said wafer and dope said wafer with said boron.

8. A method of doping a wafer of semiconductive material with gallium comprising the steps of:

oxidizing a body of gallium nitride to form a coating of gallium oxide on a plane surface of said body, disposing, in a furnace open at one end to the atmosphere, a major surface of said wafer of semiconductive material substantially parallel to, and spaced no further than 250 mils from, said gallium oxide coating on said plane surface of said oxidized gallium nitride, passing a stream of a non-oxidizing gas over said body and said wafer and out to said atmosphere through said one end, to produce a non-oxidizing ambient in said furnace, and heating said body and said wafer, in said non-oxidizing ambient, to a temperature between 600° C. and 1100° C. to vaporize said gallium oxide for at least 20 minutes, said temperature being below the melting point of said semiconductive material, so that the gallium of said gallium oxide can penetrate said major surface of said wafer and dope said wafer with said gallium.

9. A method of doping a wafer of semiconductive material with indium comprising the steps of:

oxidizing a body of indium nitride to form a coating of indium oxide on a plane surface of said body, disposing, in a furnace open at one end to the atmosphere, a major surface of said wafer of semiconductive material substantially parallel to, and spaced no further than 250 mils from, said indium oxide coating on said plane surface of said oxidized indium nitride, passing a stream of a non-oxidizing gas over said body and said wafer and out to said atmosphere through said one end, to produce a non-oxidizing ambient in said furnace, and heating said body and said wafer, in said non-oxidizing ambient, to a temperature between 600° C. and 1100° C. to vaporize said indium oxide for at least 20 minutes, said temperature being below the melting point of said semiconductive material, so that the indium of said indium oxide can penetrate said major surface of said wafer and dope wafer with said indium.

10. A method of doping a wafer of semiconductive material with aluminum comprising the steps of:

oxidizing a body of aluminum nitride to form a coating of aluminum oxide on a plane surface of said body, disposing, in a furnace open at one end to the atmosphere, a major surface of said wafer of semiconductive material substantially parallel to, and spaced no further than 250 mils from, said aluminum oxide coating on said plane surface of said oxidized aluminum nitride, passing a stream of a non-oxidizing gas over said body and said wafer and out to said atmosphere through said one end, to produce a non-oxidizing ambient in said furnace, and heating said body and said wafer, in said non-oxidizing ambient, to a temperature between 1100° C. and 1300° C. to vaporize said aluminum oxide for at least 20 minutes, said temperature being below the melting point of said semiconductive material, so that the aluminum of said aluminum oxide can penetrate said major surface of said wafer and dope said wafer with said aluminum.

11. In a method for producing a region of altered electrical characteristics in a first water of semiconductive material by the introduction of a P type impurity through a first surface of said first wafer, the improvement comprising:

disposing a second surface of a second wafer, having thereon boron oxide, adjacent and substantially parallel to said first surface, but spaced therefrom, in a non-oxidizing atmosphere, and heating said wafers at a temperature between 700° C. and 1200° C. for at least 20 minutes, said temperature being below the melting point of said semiconductive material, whereby said boron oxide vaporizes and said boron of said boron oxide diffuses through said first surface to form said region.

12. In a method for producing a region of altered electrical characteristics in a first wafer of semiconductive material by the introduction of a P type impurity through a first surface of said first wafer, the improvement comprising:

disposing a second surface of a second wafer, having thereon gallium oxide, adjacent and substantially parallel to said first surface, but spaced therefrom, in a non-oxidizing atmosphere, and heating said wafers at a temperature between 600° C. and 1100° C. for at least 20 minutes, said temperature being below the melting point of said semiconductive material, whereby said gallium oxide vaporizes and said gallium of said gallium oxide diffuses through said first surface to form said region.

13. In a method for producing a region of altered electrical characteristics in a first wafer of semiconductive material by the introduction of a P type impurity through a first surface of said first wafer, the improvement comprising:

disposing a second surface of a second wafer having thereon indium oxide, adjacent and substantially parallel to said first surface, but spaced therefrom, in a non-oxidizing atmosphere, and heating said wafers at a temperature between 600° C. and 1100° C. for at least 20 minutes, said temperature being below the melting point of said semiconductive material, whereby said indium oxide vaporizes and said indium of said indium oxide diffuses through said first surface to form said region.

14. In a method for producing a region of altered electrical characteristics in a first wafer of semiconductive material by the introduction of a P type impurity through a first surface of said first wafer, the improvement comprising:

disposing a second surface of a second wafer, having thereon aluminum oxide, adjacent and substantially parallel to said first surface, but spaced therefrom, in a non-oxidizing atmosphere, and heating said wafers at a temperature between 1100° C. and 1300° C. for at least 20 minutes, said temperature being below the melting point of said semiconductive material, whereby said aluminum oxide vaporizes and said aluminum of said aluminum oxide diffuses through said first surface to form said region.

References Cited

UNITED STATES PATENTS

| | | | |
|---|---|---|---|
| 3,070,466 | 12/1962 | Lyons | 148—188 |
| 3,244,567 | 4/1966 | Crishal | 148—189 |
| 3,279,964 | 10/1966 | Beck | 148—189 |

HYLAND BIZOT, *Primary Examiner.*